United States Patent Office 3,573,008

Patented Mar. 30, 1971

3,573,008

COMPOSITE METAL ARTICLE OF COPPER MATERIAL WITH A COAT OF NICKEL AND TIN

Robert M. Akin, Jr., North Tarrytown, N.Y., assignor to Hudson Wire Company, Ossining, N.Y.

No Drawing. Filed May 2, 1968, Ser. No. 727,142
Int. Cl. B32b 15/00
U.S. Cl. 29—199 1 Claim

ABSTRACT OF THE DISCLOSURE

Nickel-tin alloys containing from about three to about twenty percent by weight of nickel, preferably between six and about ten percent by weight, are described. These alloys are deposited on a metal substrate in the form of wire or the like, preferably a copper or copper alloy substrate by electrodeposition using a fluoroborate bath and carefully regulated pH, current density and temperature conditions. The resulting alloy coated composite product provides an electrical conductor having good solderability, freedom from galvanic corrosion and temperature capabilities which far exceed tin or tin-lead coatings on copper conductors.

This invention relates to an alloy consisting of nickel and tin and to the process of electrodepositing such alloy on a metal substrate.

Copper or copper alloy wires have for many years found application as conductors in the electrical, electronic and aerospace industries. In more recent years there has been increased insistence on "high reliability" wires of extremely small dimensions for use in such industries. At the present time copper and copper alloy wires for conductor applications are coated with various metallic materials to provide a surface with certain desired characteristics depending on the end use for the wire. Typical standard coatings include silver, tin, nickel, gold or tin-lead alloys. These coatings suffer from one or more disadvantages. For example, the tin or tin-lead alloy coating which is intended to provide protection against oxidation at moderately high temperatures (about 135° C.) has a limited shelf life with respect to solderability. This limitation is a function of the storage environment, the thickness of the coating and the method of deposition.

Another disadvantage of such coatings is their limited temperature capability. Silver coatings are used where it is desired to provide protection against oxidation and to retain solderability after exposure to continuous temperatures of 200° C. and insulation curing temperatures with fluorocarbon insulations in the range of about 390° C. The disadvantage of silver as a coating is that it has the potential of bringing about a galvanic reaction between the copper or copper alloy substrate and the silver coating. Under certain conditions of temperature, humidity and availability of oxygen, galvanic corrosion can take place to the point of total destruction of the conductor by reducing the conductor to an oxide.

A copper or copper alloy substrate, nickel coated, is used where it is desired to provide protection against oxidation after exposure of the coated wire to temperatures in the range of 250° C. to 750° C. While the nickel coated conductor has an excellent temperature rating, it is difficult to solder without the use of active fluxes which are not accepted in the aerospace industry. Moreover, nickel has a significantly high magnetic permeability which precludes its use in or near certain types of electronic and guidance control devices. A gold coated copper conductor is designed to provide high temperature resistance to oxidation and corrosion and provides almost unlimited shelf life and extremely low surface electrical contact resistance and is easily soldered under conventional conditions. However, it has the disadvantage of causing embrittlement of solders and is, of course, a very expensive metal.

It has now been found that the inadequacies of the aforedescribed coatings can be overcome by coating a copper substrate with a tin-nickel alloy containing between about three and about twenty percent nickel, preferably between about 6 and about 10 percent, thereby providing an excellent high temperature electrical conductor with desirable solderability characteristics.

Accordingly, one aspect of the present invention is to provide novel tin-nickel alloys containing 3 to 20 percent nickel which are suitable for use in coating a copper substrate used in conductor applications.

Another aspect of the present invention is to provide copper, copper alloy or copper clad conductors having plated thereon a tin-nickel alloy having three to twenty percent nickel, preferably between about six and about ten percent nickel.

Yet another aspect of the present invention is to provide tin-nickel alloy coated wire conductors which have a combination of outstanding properties which make them desirable for use as "high reliability" conductors in the aerospace and electronic industry.

An additional aspect of the present invention is to provide an electrodeposition process of producing the tin-nickel alloy coated conductors of the present invention.

These and other aspects of the present invention will become apparent from the foregoing description.

As used herein "copper substrate" means copper metal, copper alloys, as well as other metals or alloys thereof having a copper coating on its surface suitable for use as an electrical conductor.

In accordance with the present invention, it has been found that coating a tin-nickel alloy containing three to twenty percent nickel on a copper substrate in the form of wire, rods or the like, provides a composite article which is suitable as a high temperature conductor. Preferably the tin-nickel alloy contains from about six to about ten percent nickel as in this range the most desirable combination of properties in the composite article are achieved.

The tin-nickel alloy of the present invention is electrodeposited on a copper substrate using a fluoroborate bath. This discovery is surprising because other tin-nickel electroplating baths are not suitable for depositing the tin-nickel alloy of the present invention on a copper substrate. The electroplating baths heretofore used in the prior art for depositing a tin-nickel alloy on a metal substrate generally result in an alloy containing 65 percent tin and 35 percent nickel.

The composition of the plated alloy of the present invention is affected by (1) pH of the solution (2) current density (3) speed of plating (4) temperature of the bath (5) speed of agitation of the bath (6) nickel to tin free metal ratio in the plating solution and (7) distance between anode and cathode.

The most critical process conditions other than the use of a fluoroborate bath are the pH of the solution and the current density. In general to plate a copper substrate with a tin-nickel alloy having a nickel content of three to twenty percent, the ratio of nickel to tin as metal, in the bath solution is about 3:1 to about 2:1. The pH of the solution may vary from 1.5 to about 5.5. However, the preferred tin-nickel alloy coated articles are produced using a pH between about 5 to about 6. The current density may vary in the range of 25 to 150 amperes/sq. ft. However, best results are obtained with a current density between 35 to 50 amperes/sq. ft. The temperature of the bath solution is maintained between about 140° F. to 180° F., preferably about 160° F.

During the plating operation it has been found desirable to vigorously agitate the bath by mechanical means or the like. In carrying out the plating process a standard commercially available fluoroborate plating tank may be used. The anodes in the bath may be separate nickel and tin anodes which may be of the same size. It has been found desirable to position the anodes in such a way that the distance between each anode and the cathode (copper substrate to be coated) is closer at the bottom of the plating tank than near the contact bar, in order to obain more uniform current distribution and hence, uniform plating.

The bath solution used in the plating process contains nickel fluoroborate, stannous fluoroborate, an agent for regulating the pH e.g. sodium bicarbonate, ammonium hydroxide, etc. Other materials may be included in the bath such as for example, ammonium bifluoride which brightens the alloy deposit on the copper substrate.

No special precautions are necessary in the preparation of the copper substrate for plating. The usual care should be taken to ensure complete removal of surface oxide, grease, etc. by conventional means.

The coating thickness deposited on the copper substrate is not critical except to the extent that the thickness is designed to meet the desired thickness limit after redrawing the copper substrate to a finished diameter. The preferred minimum thickness limit on finished size copper wire is about $4\times10^{-5}$ inches.

As previously indicated, the tin-nickel alloy of the present invention may be deposited on any copper substrate. Illustrative of copper substrates are copper (oxygen bearing), copper (oxygen free), silver-copper alloy, cadmium-copper alloy, cadmium-chromium-copper alloy, zirconium-copper alloy, chromium-copper alloy, copper clad steel, copper clad aluminum, etc. The form of the copper substrate is preferably as wire suitable for use as an electrical conductor in either single strand or stranded configuration.

The following examples are illustrative of the products and process of the present invention.

EXAMPLE 1

Oxygen-free high conductivity copper wire of 0.04 inch diameter was cleaned electrolytically by immersing the wire in a fifty-five gallon cleaning bath containing about four ounces per gallon alkaline cleaner and two ounces per gallon sodium cyanide. A current having a density of 100 amperes/sq. ft. was passed through the bath, the bath temperature being maintained at about 160° F. and the plating solution was agitated by mechanical means. After removal from the cleaning bath the copper wire was rinsed with cold water.

This copper wire was then plated as follows:

A standard fluoroborate electroplating tank was used having a capacity of 120 gallons. Sixty gallons of ionized water were added to the tank and heated to about 160° F. after which sufficient tin fluoroborate and nickel fluoroborate were added to provide a ratio of free nickel to tin of about 2:1 in the bath solution. Sufficient ammonium hydroxide was then added to the solution to adjust the pH of the bath to between 5 and 5.5. Additional deionized water was then added to volume and the bath was again heated and maintained at 160° F. during the plating process.

The electroplating process consisted of passing a current with a density of 50 amperes/sq. ft. through this bath. The cleansed copper wire was the cathode in the bath while nickel and tin plates of the same size are the anodes. The copper wire was fed through the bath at a rate of fifty-five ft. per minute.

After two minutes of plating time the plated copper wire was removed from the bath and passed through a wipe die of the same diameter as the plated copper wire.

Then the plated copper wire was passed through a die box filled with an alkaline material for neutralizing any acid remaining on the surface of the coated copper wire. After this neutralization the coated wire was passed through another wipe die to remove any alkaline material remaining on the surface of the coated wire.

After electroplating the weight of the copper wire had increased by 4 percent over the weight of the uncoated wire.

The tin content of the tin-nickel alloy plated on the wire was determined by volumetric analysis using iodine and the nickel content was determined by colorimetric photometry. The nickel-tin alloy was found to contain 6.23 percent nickel and 93.8 percent tin.

EXAMPLE 2

Oxygen-free high conductivity copper wire of the same size as described in the previous example was cleaned as previously described.

A plating bath solution was prepared as described in Example 1 using the same materials. The pH of the bath solution was adjusted between about 5.5 and 6 using ammonium hydroxide and the temperature of the bath solution was maintained during the plating process at about 170° F. The plating time as in the previous example was about two minutes and the rate of plating was 55 ft. per minute.

After electroplating the weight of the copper wire had increased by 4 percent over the weight of the uncoated wire.

The coated copper wire in this example upon analysis was found to contain a tin-nickel alloy having a nickel content of 9.48 percent and a tin content of 90.52 percent.

EXAMPLE 3

Electrolytic tough pitch copper wire of 0.04 inch diameter was cleaned as described in Example 1. This wire was plated in a tank having a capacity of 80 gallons. Forty gallons of deionized water was added to the tank and the water heated to 160° F. Then to this water was added 408 pounds of nickel fluoroborate followed by 40 pounds of ammonium bifluoride and 104 pounds of stannous fluoroborate to provide a nickel to tin free metal ratio in the plating solution of 2.5 to 1. The pH of the bath solution was then adjusted to 1.5 by the addition of a sufficient quantity of sodium bicarbonate and additional deionized water was added to volume after which the plating bath was again heated to 160° F. and maintained at that temperature during the plating process.

The electroplating process consisted of passing a current through the bath having a density of 100 amperes/sq. ft., the wire being fed through the bath at a rate of 100 feet per minute.

After one minute and five seconds of plating time, the plated copper wire was removed from the bath and treated as described in the previous examples.

After electroplating, the weight of the copper wire had increased by 2.8 percent over the weight of the uncoated wire.

The coated copper wire was found upon analysis to contain a tin-nickel alloy having a nickel content of 19.84 percent and a tin content of 80.16 percent.

EXAMPLE 4

Copper wire as described in Example 3 was electroplated in the tank as described in that example with the following changes: The pH of the bath was adjusted to 2.5, the current density was 75 amperes/sq. ft. and the temperature of the bath was maintained at about 140° F. The plating time was again one minute and five seconds.

After electroplating the weight of the copper wire had increased by 2.5 percent over the weight of the uncoated wire.

The coated wire upon analysis was found to contain a tin-nickel alloy having a nickel content of 3.75 percent and a tin content of 96.25 percent.

Each of the plated copper wires from the foregoing examples was drawn to finer sizes using a conventional wire drawing machine at a rate of five thousand feet per minute and was resistance annealed in accordance with conventional art recognized techniques.

Tests with respect to solderability of the tin-nickel alloy coated copper wire were conducted. To determine the minimum solderability temperature, the coated copper wire was dipped in a 60% tin-40% lead solder bath for 7 seconds at different temperatures and the solder coating evaluated. No flux or cleaner was used in these tests and the samples were paper wiped before immersion in the solder bath. The minimum solderability temperature resulting in a satisfactory solder coating for the product of each example was the following: Example 1—500° F.; Example 2—520° F.; Example 3—540° F.; Example 4—490° F.

The foregoing data demonstrates the superior solderability characteristics of the tin-nickel plated product of the present invention in comparison to nickel plated copper wire which requires a minimum temperature of about 720° F. to solder without any active flux. Moreover, the minimum solderability characteristics of the tin-nickel plated copper substrate of the present invention compare favorably with the minimum solderability temperature of tin plated copper and silver plated copper which in both cases is about 420° F. However, the tin-nickel plated product of the present invention has a greater shelf life with respect to solderability than a tin-or tin-lead plated material and also substantially greater temperature capability which permits use of insulation curing temperatures that will not cause the plated material to flow and short out. For example, tin or tin-lead plated materials can be insulated with materials which cure only as high as about 150° C. Thus the usually preferred fluorocarbon insulation, such as tetrafluoroethylene, which cures at about 390° C. are not compatible with such tin or tin-lead plated materials because of their low temperatures capabilities.

While preferred embodiments of the invention have been described, it will be understood by those skilled in the art that various changes and modifications may be made herein without departing from the spirit of the invention.

What is claimed is:

1. An electrical conductor comprising a wire substrate selected from the class consisting of copper, and a copper alloy having deposited thereon an alloy coating consisting essentially of nickel and tin, said nickel comprising about 3 to about 10 percent by weight of said alloy.

References Cited

UNITED STATES PATENTS

| | | | |
|---|---|---|---|
| 2,715,259 | 8/1955 | Mohler | 29—196.4 |
| 3,481,795 | 12/1969 | Lane | 75—175 |
| 1,637,033 | 1/1927 | Basch | 29—199UX |
| 2,147,709 | 2/1939 | Lawton | 29—199UX |
| 2,688,574 | 9/1954 | Reed | 29—199X |
| 2,270,404 | 1/1942 | Bitter | 29—199 |

OTHER REFERENCES

"Constitution of Binary Alloys," by Hansen, pp. 1042–1045, published by McGraw-Hill Book Company, 1958.

HYLAND BIZOT, Primary Examiner

U.S. Cl. X.R.

29—194